(12) United States Patent
Truong et al.

(10) Patent No.: US 9,645,004 B2
(45) Date of Patent: May 9, 2017

(54) OPTICAL IMPEDANCE MODULATION FOR FUEL QUANTITY MEASUREMENT COMPRISING A FIBER ENCASED BY A TUBE HAVING A LONGITUDINAL SLOT WITH A LENS

(71) Applicant: The Boeing Company, Chicago, IL (US)

(72) Inventors: Tuong K. Truong, Bellevue, WA (US); Dennis G. Koshinz, Bellevue, WA (US); Eric Y. Chan, Mercer Island, WA (US); Todd C. Thomas, Mukilteo, WA (US); J. Everett Groat, Snohomish, WA (US); Sigvard J. Wahlin, Everett, WA (US); John L. Vento, Arlington, WA (US); Sham S. Hariram, Seattle, WA (US); Richard J. Nesting, Everett, WA (US)

(73) Assignee: The Boeing Company, Chicago, IL (US)

( * ) Notice: Subject to any disclaimer, the term of this patent is extended or adjusted under 35 U.S.C. 154(b) by 395 days.

(21) Appl. No.: 14/547,828

(22) Filed: Nov. 19, 2014

(65) Prior Publication Data
US 2016/0138958 A1    May 19, 2016

(51) Int. Cl.
G01F 23/292    (2006.01)
G01F 22/00     (2006.01)
B64D 37/00     (2006.01)

(52) U.S. Cl.
CPC ......... *G01F 23/292* (2013.01); *B64D 37/005* (2013.01); *G01F 22/00* (2013.01); *Y02T 50/44* (2013.01)

(58) Field of Classification Search
CPC ........ G01F 23/292; G01F 23/04; G01F 23/74; G01J 1/0425

(Continued)

(56) References Cited

U.S. PATENT DOCUMENTS 4,870,292 A    9/1989    Alpert et al.
4,928,006 A    5/1990    Kershaw (Continued)

FOREIGN PATENT DOCUMENTS

CA    1332205      10/1994
DE    3940455 A1    9/1990

(Continued)

OTHER PUBLICATIONS

Abstract, Zhao et al., "Novel light-leaking optical fiber liquid-level sensor for aircraft fuel gauging", Opt. Eng., vol. 52, No. 1, 014402 (Jan. 4, 2013); http://dx.doi.org/10.1117/1.OE.52.1.014402.

(Continued)

*Primary Examiner* — Que T Le
(74) *Attorney, Agent, or Firm* — Ostrager Chong Flaherty & Broitman P.C.

(57) ABSTRACT

Systems and methods that use an optical impedance sensor that eliminates electricity for measuring fuel quantity in fuel tanks. The optical impedance sensor comprises two optical fibers spaced apart inside a meniscus tube, one to transmit light along its length and the other to receive light along its length. The meniscus tube minimizes the sloshing of fuel level. The fuel level in the tank modulates the optical impedance between the two optical fibers, resulting in changes in the total light received by an optical detector. Depending on fuel tank height, the optical impedance sensor may comprise different embodiments in which the detection apparatus shapes the light to be unidirectional (emitted and collected only on one side of the fiber) or omnidirectional (all directions).

20 Claims, 5 Drawing Sheets

(58) Field of Classification Search
USPC .................................. 250/227.25, 221, 577
See application file for complete search history.

(56) References Cited

U.S. PATENT DOCUMENTS

| | | | |
|---|---|---|---|
| 4,942,306 A | | 7/1990 | Colbourne |
| 4,994,682 A | | 2/1991 | Woodside |
| 5,367,175 A | * | 11/1994 | Bobb ................ G01D 5/35303 250/227.14 |
| 6,172,377 B1 | | 1/2001 | Weiss |
| 6,274,880 B1 | | 8/2001 | Walker |
| 6,333,512 B1 | | 12/2001 | Wirthlin |
| 6,429,447 B1 | | 8/2002 | Nowak et al. |
| 6,795,598 B1 | | 9/2004 | Devenyi |
| 7,049,622 B1 | | 5/2006 | Weiss |
| 7,161,165 B2 | | 1/2007 | Wirthlin |
| 7,660,494 B2 | | 2/2010 | Anderson |
| 7,710,567 B1 | | 5/2010 | Mentzer et al. |
| 2005/0236591 A1 | | 10/2005 | Wirthlin |
| 2007/0145309 A1 | | 6/2007 | Zhang |
| 2009/0076744 A1 | | 3/2009 | Anderson |
| 2009/0084995 A1 | | 4/2009 | Cierullies et al. |
| 2014/0014777 A1 | | 1/2014 | Kreitmair-Steck et al. |

FOREIGN PATENT DOCUMENTS

| | | |
|---|---|---|
| GB | 2293007 A | 3/1996 |
| WO | 2010051806 A1 | 5/2010 |

OTHER PUBLICATIONS

Extended European Search Report dated Jul. 6, 2016 in European Patent Application No. 15195345.2 (European counterpart to the instant U.S. patent application).
English Abstract of DE3940455.

* cited by examiner

OPTICAL IMPEDANCE MODULATION FOR FUEL QUANTITY MEASUREMENT COMPRISING A FIBER ENCASED BY A TUBE HAVING A LONGITUDINAL SLOT WITH A LENS

BACKGROUND

This disclosure generally relates to systems and methods for measuring a level of liquid in a reservoir, such as a storage tank or other container. More particularly, this disclosure relates to systems and methods for liquid level measurement using an optical sensor.

A need to continuously measure the level of a liquid exists in many commercial and military applications. For example, liquid-level sensors are commonly used in the fuel tanks of aircraft, automobiles, and trucks. Liquid-level sensors are also used to monitor liquid levels within storage tanks used for fuel dispensing, wastewater treatment, chemical storage, food processing, etc.

Many transducers for measuring liquid level employ electricity. The electrical output of such transducers changes in response to a change in the liquid level being measured, and is typically in the form of a change in resistance, capacitance, current flow, magnetic field, frequency, and so on. These types of transducers may include variable capacitors or resistors, optical components, Hall Effect sensors, strain gauges, ultrasonic devices, and so on.

Currently most fuel sensors on aircraft use electricity. For example, existing electrical capacitance sensors require electrical wiring inside the tank, which in turn requires complex installations and protection measures to preclude a safety issue under certain electrical fault conditions. This electrical wiring requires careful shielding, bonding, and grounding to minimize stray capacitance and further requires periodic maintenance to ensure electrical contact integrity.

There is ample room for improvements in systems and methods that can detect the level of liquid in a fuel tank without introducing electrical current into the fuel tank.

SUMMARY

The subject matter disclosed herein is directed to systems and methods that use an optical impedance sensor to eliminate electricity for measuring fuel quantity in fuel tanks. The optical impedance sensor comprises two optical fibers spaced apart inside a meniscus tube, one to transmit light along its length and the other to receive light along its length. The meniscus tube minimizes the sloshing of fuel level. The variable fuel level in the tank produces changes in the optical impedance between the two optical fibers, resulting in changes in the total light received by an optical detector.

Depending on fuel tank height, which can range from a few inches to a few feet, the optical impedance sensor may comprise different embodiments in which the detection apparatus shapes the light to be unidirectional (emitted and collected only on one side of the fiber) or omnidirectional (all directions). The optical fibers can be made of either glass or plastic with sufficient optical output along the entire length of the sensor.

The optical impedance sensors disclosed herein do not require any electricity. Nor does the sensor installation require that the optical fiber be in contact with the fuel inside the tank, thereby avoiding possible contaminant buildup. The optical impedance sensors are designed to simplify complex safety measures while maintaining accuracy and reducing cost, weight and volume as compared to existing electrical capacitance sensors.

One aspect of the subject matter disclosed in detail below is an optical impedance sensor comprising: a tube having an internal volume; a first light guide comprising a first optical fiber and a first tube which encases the first optical fiber, wherein the first tube comprises a first jacket having a longitudinal slot and a first lens disposed in the longitudinal slot of the first jacket and optically coupled to the first optical fiber, and the first optical fiber comprises a cladding having a non-uniform surface in an area bounded by the longitudinal slot of the first jacket; and a second light guide comprising a second optical fiber spaced apart from the first optical fiber, wherein the second optical fiber comprises a cladding having a non-uniform surface in an area confronting the longitudinal slot of the first jacket. The non-uniform cladding surface is designed to control the amount of light emitting/collecting along the length of the optical fiber.

In accordance with some embodiments, the second light guide further comprises a second tube which encases the second optical fiber, the second tube comprising a second jacket having a longitudinal slot and a second lens disposed in the longitudinal slot of the second jacket and optically coupled to the second optical fiber, wherein the longitudinal slots of the first and second jackets are arranged in mutual opposition so that at least some light emitted from the longitudinal slot of the first jacket will directly enter the longitudinal slot of the second jacket.

In accordance with other embodiments, the optical impedance sensor further comprises a third light guide comprising a third optical fiber and a second tube which encases the third optical fiber, wherein the second tube comprises a second jacket having a longitudinal slot and a second lens disposed in the longitudinal slot of the second jacket and optically coupled to the third optical fiber, and the third optical fiber comprises a cladding having a non-uniform surface in an area bounded by the longitudinal slot of the second jacket. The first and third light guides may have non-overlapping or slightly overlapping longitudinal slots which both emit light toward different segments of the second light guide.

Another aspect of the subject matter disclosed herein is a system for measuring a level of liquid in a reservoir, comprising: a tube having an internal volume, the tube being disposed in the reservoir; an optical source for outputting light; an optical detector for converting impinging light into an electrical signal representing an optical power of the impinging light; a first light guide comprising a first optical fiber and a first tube which encases the first optical fiber, wherein the first tube comprises a first jacket having a longitudinal slot and a first lens disposed in the longitudinal slot of the first jacket and optically coupled to the first optical fiber, and the first optical fiber comprises a cladding and a core inside the cladding, the cladding of the first optical fiber having a non-uniform surface in an area bounded by the longitudinal slot of the first jacket, and the core of the first optical fiber being optically coupled to receive light from the optical source; and a second light guide comprising a second optical fiber spaced apart from the first optical fiber, wherein the second optical fiber comprises a cladding and a core inside the cladding, the cladding of the second optical fiber having a non-uniform surface which receives light emitted by the first optical fiber through the longitudinal slot of the first jacket, and the core of the second optical fiber being optically coupled to output light to the optical detector. The foregoing system may further comprise a computer system programmed to compute a level of liquid in the reservoir based on optical power data received from the optical detector. In one implementation, the optical source comprises a laser and the optical detector comprises a photodiode. The disclosed system can be used to measure the level of fuel in a fuel tank on an airplane.

In accordance with one embodiment of the system described in the preceding paragraph, the second light guide further comprises a second tube which encases the second optical fiber, the second tube comprising a second jacket having a longitudinal slot and a second lens disposed in the longitudinal slot of the second jacket and optically coupled to the second optical fiber, wherein the longitudinal slots of the first and second jackets are arranged in mutual opposition so that at least some light emitted from the longitudinal slot of the first jacket will directly enter the longitudinal slot of the second jacket.

In accordance with another embodiment, the system further comprises a third light guide comprising a third optical fiber and a second tube which encases the third optical fiber, wherein the second tube comprises a second jacket having a longitudinal slot and a second lens disposed in the longitudinal slot of the second jacket and optically coupled to the third optical fiber, and the third optical fiber comprises a cladding having a non-uniform surface in an area bounded by the longitudinal slot of the second jacket.

A further aspect is a light guide comprising: an optical fiber having an axis and a circumferential surface; a jacket having a longitudinal slot that extends parallel to the axis of the optical fiber, the jacket being in contact with the circumferential surface of the optical fiber except in an area of the longitudinal slot; and a lens disposed in the longitudinal slot of the jacket and interfaced with the circumferential surface of the optical fiber, wherein the optical fiber comprises a cladding having a non-uniform surface in an area bounded by the longitudinal slot of the jacket. The light guide may further comprise a curved reflective surface disposed between the optical fiber and the jacket. Preferably the jacket is made of a material which is not optically transparent or translucent.

Yet another aspect of the subject matter disclosed herein is a method for measuring a level of fuel in a fuel tank having multiple compartments, comprising: (a) placing a first tube in a first compartment; (b) placing a first light guide inside the first tube with an orientation that will be generally perpendicular to a surface of the fuel when the first compartment is at least partially filled with fuel, wherein the first light guide comprises a first optical fiber that is encased to prevent wetting of the first optical fiber when the first light guide is immersed in the fuel; (c) placing a second light guide inside the first tube spaced apart from and generally parallel with the first light guide, wherein the second light guide comprises a second optical fiber that is encased to prevent wetting of the second optical fiber when the second light guide is immersed in the fuel; (d) emitting light along a length of the first light guide toward a length of the second light guide; (e) detecting the optical power output from the second light guide; and (f) determining a level of the fuel in the first compartment based on the detected optical power output from the second light guide. In accordance with some embodiments, the step of determining the level of fuel comprises comparing the detected optical power with a database of calibrated fuel level versus optical power. The method may further comprise: (g) placing a second tube in a second compartment having a height less than a height of the first compartment; (h) placing a third light guide inside the second tube with an orientation that will be generally perpendicular to a surface of the fuel when the second compartment is at least partially filled with fuel, wherein the third light guide comprises a third optical fiber that is encased to prevent wetting of the third optical fiber when the third light guide is immersed in the fuel; (i) placing a fourth light guide inside the second tube spaced apart from and surrounding the third light guide, wherein the fourth light guide has a spiral shape and comprises a fourth optical fiber that is encased to prevent wetting of the fourth optical fiber when the fourth light guide is immersed in the fuel; (j) emitting light along a length of the third light guide toward a length of the fourth light guide; (k) detecting the optical power output from the fourth light guide; and (l) determining a level of the fuel in the second compartment based on the detected optical power output from the fourth light guide. This methodology is well suited for measuring the level of fuel in a fuel tank that is incorporated in a wing of an aircraft.

Other aspects of optical impedance sensors suitable for use in fuel tanks are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments of systems and methods for measurement of a level of liquid in a reservoir will now be described in detail for the purpose of illustration. At least some of the details disclosed below relate to optional features or aspects, which in some applications may be omitted without departing from the scope of the claims appended hereto.

Figure 1:
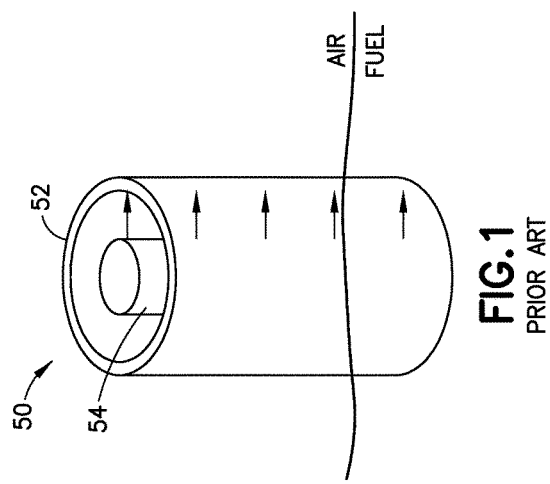
FIG. 1 is a diagram representing an isometric view of components of a typical sensor that modulates the electrical capacitance of a liquid. The nonlinear line spanning the sensor represents a level of liquid; the arrows represent flow of electrical charges.

FIG. 1 shows a liquid level sensor 50 comprising an inner aluminum tube 54 and an outer aluminum tube 54 surrounding and concentric with the inner aluminum tube 54. The generally horizontal nonlinear line spanning the liquid level sensor 50 represents a level of fuel, i.e., an interface between fuel and air. Some of the fuel occupies space between the aluminum tubes. The total electrical capacitance of liquid level sensor 50 changes with fuel level in a well-known manner (air and fuel have different dielectric constants). The arrows represent flow of electrical charges from the inner aluminum tube 54 toward the outer aluminum tube 52 under the influence of an electric field in the space between the aluminum tubes. This liquid level sensor can be used to detect the fuel level because the electrical current flowing out of the outer aluminum tube 52 changes in dependence on the height of the volume of fuel in the space between the aluminum tubes.

Figure 2:
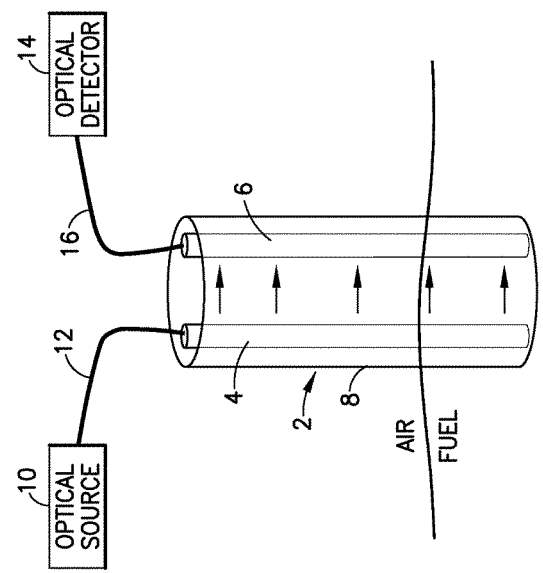
FIG. 2 is a hybrid diagram representing a system for measuring a level of a liquid that comprises an optical impedance sensor that modulates the optical impedance of the liquid. This hybrid diagram comprises a block diagram showing components of an optical transceiver and a diagram representing an isometric view of the optical impedance sensor. The nonlinear line spanning the sensor represents a level of liquid; the arrows represent photons propagating from one optical fiber to another optical fiber.

FIG. 2 is a hybrid diagram representing a system for measuring a level of fuel in a reservoir in accordance with one embodiment of the optical impedance modulation concept disclosed herein. The system depicted in FIG. 2 comprises an optical impedance sensor 2 that detects the optical impedance of the fluid separating the transmitting and receiving optical fibers, obtaining optical power data that can be later used to determine the fuel level. In accordance with the embodiment shown in FIG. 2, optical impedance sensor 2 comprises: a transmitting optical fiber 4 optically coupled to an optical source 10 by means of an optical fiber 12; and a receiving optical fiber 6 optically coupled to an optical detector 14 by means of an optical fiber 16. The optical impedance sensor 2 further comprises a meniscus tube 8 that minimizes fuel sloshing in a fuel tank (not shown). The nonlinear line spanning the optical impedance sensor 2 in FIG. 2 represents a level of fuel. The transmitting and receiving optical fibers 4 and 6 are placed inside the meniscus tube in spaced-apart relationship (preferably the fibers are straight and parallel to each other). In cases where the fuel tank is incorporated in a wing of an airplane, the transmitting and receiving optical fibers 4 and 6 are preferably rigidly supported in a fixed spatial relationship to provide a separation distance which is optimized for optical received power versus ice slush particles that may form in the fuel tank. The meniscus tube 8, which extends to the floor of the fuel tank, has openings near that floor which allow fuel to flow into the volume of space bounded by the meniscus tube 8. The level of the fuel will be the same inside and outside the meniscus tube 8.

When pumped by the optical source 10, the transmitting optical fiber 4 emits light radially outward. The axial distribution of emitted light may be substantially constant along the length of transmitting optical fiber 4. A first portion of the light will pass through the fuel and illuminates a lower portion of the receiving optical fiber 6. A second portion of light emitted by transmitting optical fiber 4 will pass through the air and illuminate an upper portion of the receiving optical fiber 6. At least some of the light received by receiving optical fiber 6 is guided upwards and other light is guided downwards inside the core of receiving optical fiber 6. The light guided downwards may be reflected upwards from a mirror disposed at the bottom end of receiving optical fiber 6 (see the description of FIG. 4 below). The light guided upwards and exits the upper end of receiving optical fiber 6. The light output by receiving optical fiber 6 is transmitted to the optical detector 14, which converts impinging light into electrical current. This electrical current is conducted by a cable to a processing unit (not shown in FIG. 2, but see FIG. 3). The processor analyzes the signal from the optical detector 14 and computes the height of the air/fuel interface.

The arrows in FIG. 2 represent light (i.e., photons) propagating from the transmitting optical fiber 4 to the receiving optical fiber 6 during operation of optical source 10. During monitoring of the fuel level, the brightness (i.e., intensity) of the light produced by optical source 10 (i.e., its optical power) is preferably constant. As the fuel level varies, the optical impedance of the fuel in the volume of space between transmitting optical fiber 4 and receiving optical fiber 6 changes in dependence on the fuel level, due to the fact that air and fuel have different refractive indices.

It is well known that air has an index of refraction less than the index of refraction of fuel; that fuel has an index of refraction less than the index of refraction of cladding of an optical fiber; and that the cladding has an index of refraction less than the index of refraction of the core of the optical fiber. The refractive indices determine the amount of light that is reflected when reaching an interface.

Since more optical power is lost (i.e., optical impedance is greater) in liquids than in air, the optical power output by the receiving optical fiber 6 will monotonically increase as the liquid level falls. In other words, as the fuel level changes, the optical impedance between transmitting optical fiber 4 and receiving optical fiber 6 will change. These changes in optical impedance in turn produce changes in the optical power (i.e., light intensity) output by the receiving optical fiber 6 to the optical detector 14.

Although not depicted in FIG. 2, each optical fiber is a flexible, optically transparent or translucent fiber made of extruded glass or plastic. It can function as a waveguide or light pipe to transmit light between the two ends of the fiber. Optical fibers typically include a transparent or translucent core having a relatively higher index of refraction surrounded by a transparent or translucent cladding material having a relatively lower index of refraction. Light is kept in the core by total internal reflection. This causes the optical fiber to act as a waveguide.

In accordance with the embodiments disclosed herein, the cladding of the transmitting optical fiber 4 is modified (e.g., by roughening or notching the circumferential surface) to enable a controlled level of radial light output along the fiber's length. More specifically, the cladding of transmitting optical fiber 4 may be treated to produce a non-uniform surface at least in an area bounded by a longitudinal slot in a jacket. For example, the outer surface of the cladding may be roughened or notched at least in an area overlapped by a longitudinal slot in a jacket, thereby forming a side window, as will be described in more detail below with reference to FIGS. 5 and 6. The cladding of the receiving optical fiber 6 may be modified in a similar manner to form a side window that faces toward the side window of the transmitting optical fiber 4 when the optical sensor is installed inside a fuel tank.

In addition or in the alternative, the receiving optical fiber 6 can be a fluorescent fiber having a core containing fluorescing dopants, which can be activated by light from the transmitting optical fiber 4 impinging on the side window of the receiving optical fiber 6 and then entering the core of the receiving optical fiber 6. (Fluorescence occurs when an orbital electron relaxes to its ground state by emitting a photon of light after being excited to a higher quantum state by some type of energy.) The fluorescing dopants produce light which travels along the length of the receiving optical fiber 6 and is then output to the optical detector 14.

At any given axial position along the length of the transmitting optical fiber 4, the circumferential variation in the emitted light is preferably strongly peaked in a narrow angular range subtended by the side window formed by modification of the cladding of the transmitting optical fiber 4. As previously mentioned, this side window can be formed by modifying the cladding of the optical fibers (e.g., by notching, scratching or sanding) on only one side to more easily emit light with an angular spread that impinges on a corresponding side window formed by modification of the cladding of the receiving optical fiber 6.

Figure 3:
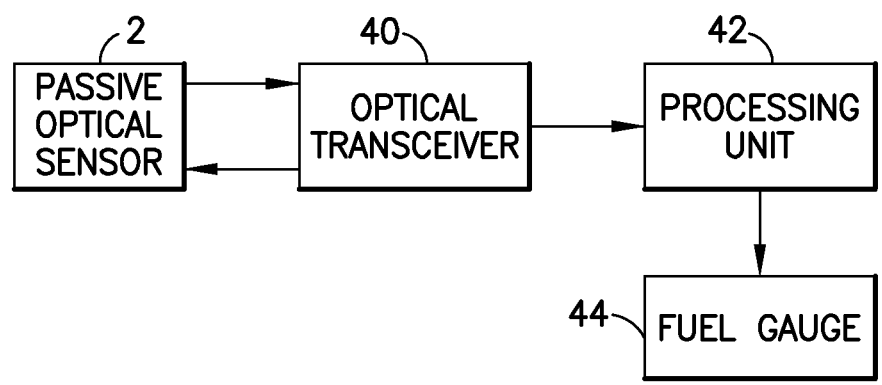
FIG. 3 is a block diagram representing components of a system for measuring a level of liquid in a reservoir in accordance with one embodiment.

FIG. 3 is a block diagram representing components of a system for measuring a level of fuel in a fuel tank in accordance with one embodiment. The system comprises a passive optical sensor 2 of the type depicted in FIG. 2, an optical transceiver 40 which is optically coupled to the optical sensor 2, a processing unit 42 which is electrically coupled to the optical transceiver 40, and a fuel gauge 44 which indicates the fuel level graphically and/or alphanumerically. In this example, the optical sensor 2 is installed in a compartment of a fuel tank. The components of optical transceiver 40 may comprise: an optical source in the form of a transmit integrated circuit connected to a transmit optical subassembly (comprising a laser or LED); and an optical detector in the form of a receive integrated circuit connected to a receive optical subassembly (comprising a photodiode).

The fuel gauge 44 may take the form of a display device having a display processor programmed to a display screen to display the measurement results (e.g., the fuel level) graphically and/or alphanumerically.

The magnitude of the signal output by the light detector of optical transceiver 40 increases monotonically with increasing intensity of light emitted from the end of receiving optical fiber 6. The processing unit 42 may be a dedicated microprocessor or a general-purpose computer, and may calculate the measured level (i.e., height) of the fuel by using a look-up table, a calibration curve, or by solving equations, as appropriate. The fuel gauge 44 may present information that identifies the amount of fuel present within the fuel tank based on optical power data received by the processing unit 42.

The processing unit 42 may be a computer or part of a flight control system located on an aircraft. In identifying the amount of fuel present in an irregular-shaped fuel tank, the processing unit 42 may execute various routines to calculate the amount of fuel present based on optical power data received from multiple receiving optical fibers appropriately placed in various compartments of the fuel tank. The fuel information processing software may include routines take into account the shape of the fuel tank to determine the amount of fuel remaining in the fuel tank. The fuel information processing software may further include routines for calibrating processes to form a baseline before a first use or to maintain accuracy of fuel readings. The readings provided by the processing unit 42 to the fuel gauge 44 may be integrated or averaged before presentation and may be provided at different time intervals.

In the example shown in FIG. 3, optical fibers are used to measure the level of fuel in a fuel tank. In other embodiments, the same apparatus may be used to detect other liquids. For example, the system described above may be used to detect the presence of water in a container or hydraulic fluids in a reservoir for a hydraulic system. The illustration of detecting fuel in a fuel tank is presented for purposes of illustration and not meant to limit the manner in which the system shown in FIG. 3 may be used.

Figure 4:
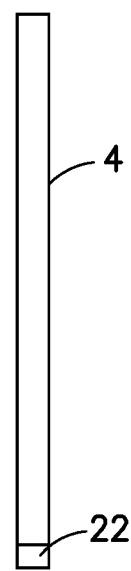
FIG. 4 is a diagram representing an elevation view of an optical fiber having a mirror cap at one end for increasing the intensity of light inside the fiber.

As shown in FIG. 4, a reflective mirror cap 22 may be attached to the bottom end of the transmitting optical fiber 4 to reflect light back through transmitting optical fiber 4 and to prevent light from being lost out the bottom end. A similar reflective cap may be attached to the bottom end of the receiving optical fiber 6 to reflect light back through the receiving optical fiber 6 toward the optical detector 14 (see FIG. 3).

Figure 5:
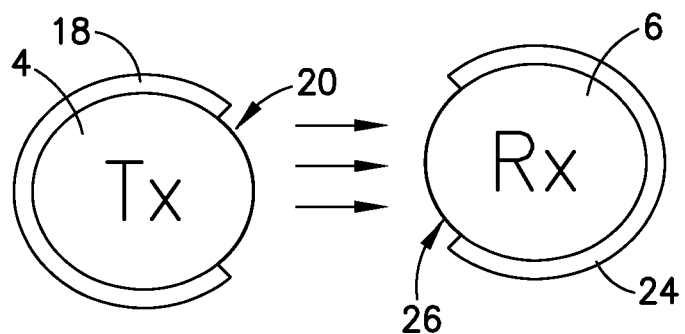
FIG. 5 is a diagram representing a plan view of a pair of optical fibers encased in respective jackets having mutually opposing longitudinal slots for sideways optical coupling of light (indicated by arrows) from the transmitting optical fiber to the receiving optical fiber.

FIG. 5 is a diagram representing a plan view of a pair of straight light guides of an optical sensor in accordance with an embodiment intended for use in the measurement of a level of a liquid that will not damage exposed optical fibers when the latter are immersed in the liquid. The transmitting light guide comprises: a transmitting optical fiber 4 having an axis and a circumferential surface; and a jacket 18 having a longitudinal slot 20 that extends parallel to the axis of the transmitting optical fiber 4 for the entire length of the latter. Preferably the longitudinal slot 20 overlaps a side window formed by a non-uniform surface on the cladding of the transmitting optical fiber 4. The jacket 18 is in contact with and covers the circumferential surface of the transmitting optical fiber 4 except in the area of longitudinal slot 20. The transmitting light guide may further comprise a curved reflective surface disposed between the transmitting optical fiber 4 and the jacket 18. Preferably the jacket 18 is made of a material which is not optically transparent or translucent, such as metal or polymeric material.

Similarly, the receiving light guide comprises: a receiving optical fiber 6 having an axis and a circumferential surface; and a jacket 24 having a longitudinal slot 26 that extends parallel to the axis of the receiving optical fiber 6 for the entire length of the latter. Preferably the longitudinal slot 26 overlaps the side window formed by a non-uniform surface on the cladding of the receiving optical fiber 6. The jacket 24 is in contact with the circumferential surface of the receiving optical fiber 6 except in an area of the longitudinal slot 26. The receiving light guide may further comprise a curved reflective surface disposed between the receiving optical fiber 6 and the jacket 24. Preferably the jacket 24 is made of a material which is not optically transparent or translucent, such as metal or polymeric material. In the case where the jacket 24 is made of polymeric material, jacket 24 can be formed by molding. The transmission optical fiber 4 may have a circular, square or hexagonal cross section, with the molded jacket conforming to the shape of the optical fiber.

The arrows in FIG. 5 represent light which has been emitted by transmitting optical fiber 4 through the side window formed in the cladding of the transmitting optical fiber 4 and is propagating through intervening fluid (e.g., liquid or air) toward the corresponding side window formed in the cladding of receiving optical fiber 6. However, it should be appreciated that, in the absence of a focusing lens overlying the side window of the transmitting optical fiber 4, the exiting rays of light may be divergent, rather than collimated.

Figure 6:
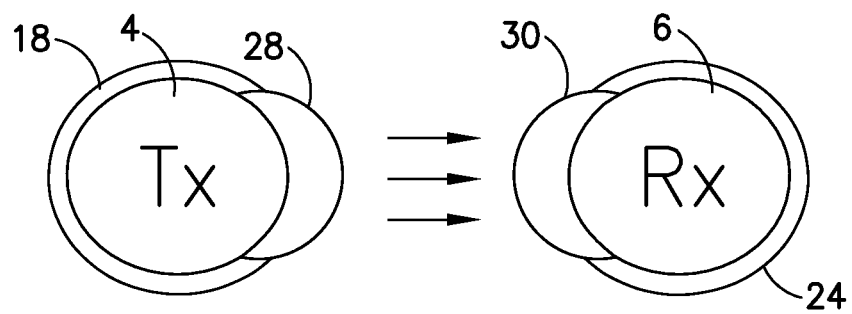
FIG. 6 is a diagram representing a plan view of a pair of optical fibers encased in respective jackets having mutually opposing longitudinal slots covered by respective lenses for sideways optical coupling of light (indicated by arrows) from the transmitting optical fiber to the receiving optical fiber.

FIG. 6 is a diagram representing a plan view of a pair of straight light guides of an optical sensor in accordance with an embodiment in which the liquid is not in direct contact with the transmitting and receiving optical fibers 4 and 6. The only difference from the embodiment depicted in FIG. 5 is that the transmitting and receiving light guides further comprise respective lenses 28 and 30 formed (e.g., by molding) in the longitudinal slots of the respective jackets 18 and 24. Preferably the lenses 28 and 30 extend the full length of the longitudinal slots. In combination, lens 28 and jacket 18 encase the transmitting optical fiber 4, with lens 28 interfacing with the side window of transmitting optical fiber 4. Similarly, lens 30 and jacket 24 encase the receiving optical fiber 6, with lens 30 interfacing with the side window of receiving optical fiber 6. Preferably the lenses 28 and 30 are made of epoxy.

The arrows in FIG. 6 represent light which has been emitted by transmitting optical fiber 4 through the lens 28 and is propagating through intervening fluid (e.g., liquid or air) toward the lens 30 of the receiving light guide. The lens 28 may be designed so that exiting rays of light are directed in parallel toward the lens 30. The lens 30 may be designed so that impinging parallel rays of light are converged into the receiving optical fiber 6. The lenses have the effect of increasing the intensity of the light output by receiving optical fiber 6 for the same optical power being pumped into transmitting optical fiber 4, thereby enhancing the performance of the optical impedance sensor.

If the optical power transmitted by a high-intensity LED is adequate, then the system may comprise a single transmitting optical fiber disposed parallel with one receiving optical fiber. If the optical power from one LED is inadequate, then the amount of light emitted can be increased in various ways. In some embodiments, the system may comprise two or more transmitting optical fibers surrounding a centrally located receiving optical fiber. In this case the receiving optical fiber is collecting light from all sides, and each transmitting optical has its own LED source. In these alternative embodiments, the signal-to-noise ratio of the optical impedance sensor is increased by employing multiple transmitting and/or receiving optical fibers.

Figure 7:
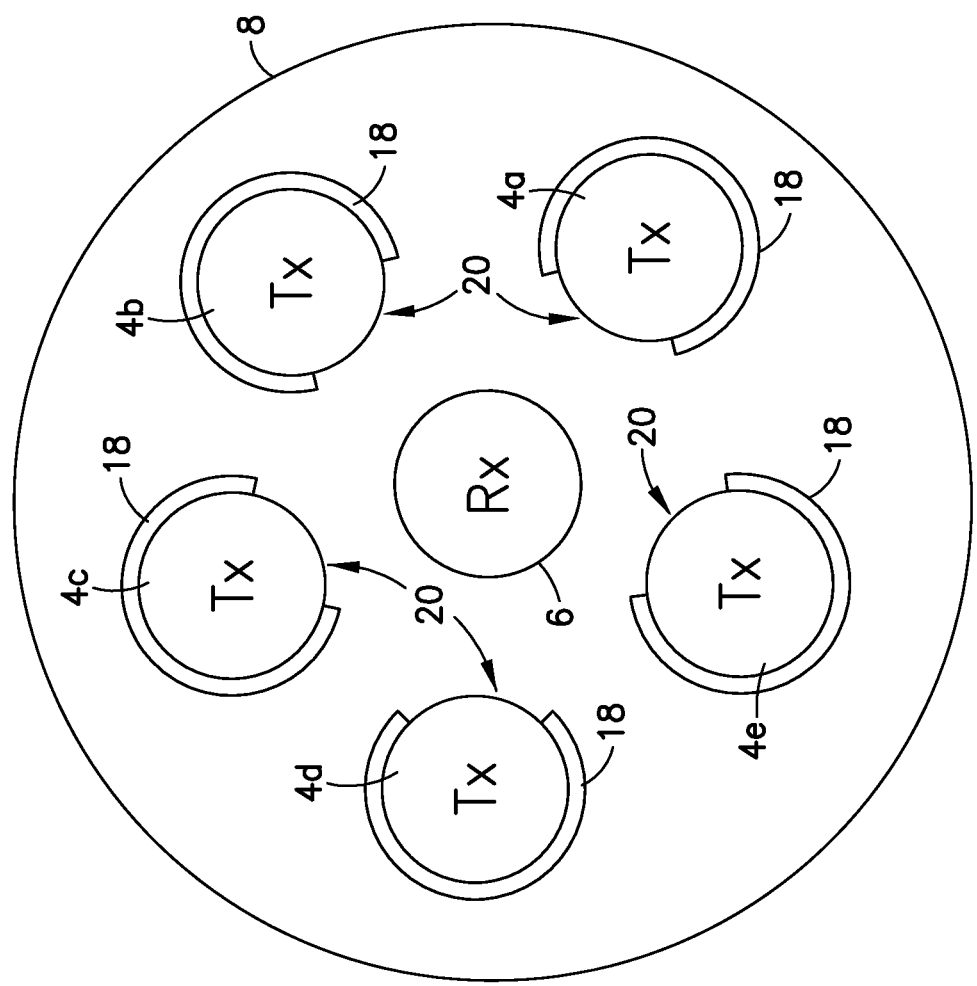
FIG. 7 is a diagram representing a plan view of an optical impedance sensor having a single centrally located receiving optical fiber surrounded by a multiplicity of transmitting optical fibers inside a meniscus tube, each transmitting optical fiber having a side window for emission of light toward the receiving optical fiber.

FIG. 7 is a diagram representing a plan view of an optical impedance sensor having a single centrally located receiving optical fiber 6 surrounded by a multiplicity of transmitting optical fibers 4a-4e inside a meniscus tube 8, each of transmitting optical fibers 4a-4e being partly encased in a respective jacket 18 having a longitudinal slot for sideways transmission of light toward the receiving optical fiber 6. In this case the entire circumferential surface of the cladding of the receiving optical fiber 6 may be modified (e.g., by roughening, notching or sanding) to facilitate the entry of light into the receiving optical fiber 6. During operation, light emitted by transmitting optical fibers 4a-4e is directed toward the centrally located receiving optical fiber 6. The optical power output by receiving optical fiber 6 will be dependent on the level of liquid inside the meniscus tube 8.

Figure 8:
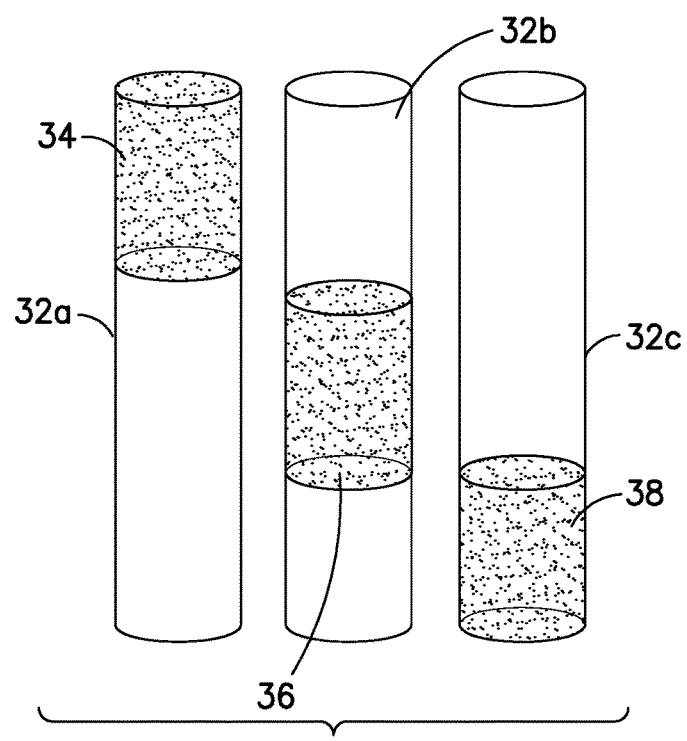
FIG. 8 is a diagram representing an isometric view of three optical fibers having non-overlapping or slightly overlapping emitting segments (indicated by speckle patterns) for use in an optical impedance sensor having an extended length.

In accordance with a further enhancement, each surrounding transmitting optical fiber may concentrate its transmit power only in one segment of the fiber length. FIG. 8 is a diagram representing an isometric view of three transmitting optical fibers 32a-32c having non-overlapping or slightly overlapping emitting segments 34, 36 and 38 respectively (indicated by speckle patterns) for use in an optical impedance sensor having an extended length. (The portions of transmitting optical fibers 32a-32c which are not speckled indicate portions of the optical fibers which have not been modified or altered to encourage side emission.) Each of the emitting segments 34, 36 and 38 may be constructed with a respective side window and lens (as previously described) to emit light in a respective preferred direction, i.e., toward the side window of a centrally located receiving optical fiber (as seen in FIG. 7). The processing unit can be programmed to take into account the signals received from respective optical transceivers, which signals represent the optical power output by the respective receiving optical fibers. The system can be calibrated to determine the fuel level based on the optical power data. The height of the air/fuel interface in a fuel tank compartment can be readily determined from the optical power data in a well-known manner based on the attenuation losses due to light propagating through fuel rather than air.

A wing of an airplane has a height that varies, especially in a spanwise direction. As a consequence, a fuel tank incorporated inside an aircraft wing has a height that varies. Typically a wing fuel tank comprises a multiplicity of compartments. It would be desirable to provide different types of fuel level sensors which are suitable for installation in fuel tank compartments of different heights. For example, some compartments at the root of a wing may have a height of a few feet, while other compartments near the tip of the wing may have a height of a few inches.

A tall sensor is typically installed in the fuel tank compartment at the root of the wing. Due to the longer length, there is enough difference in fuel height that enables 1% accuracy by simple use of a straight transmitting optical fiber in parallel with a receiving optical fiber. There is a controlled gap between the two fibers optimized for optical received power versus ice slush particles in the fuel tank.

Figure 9:
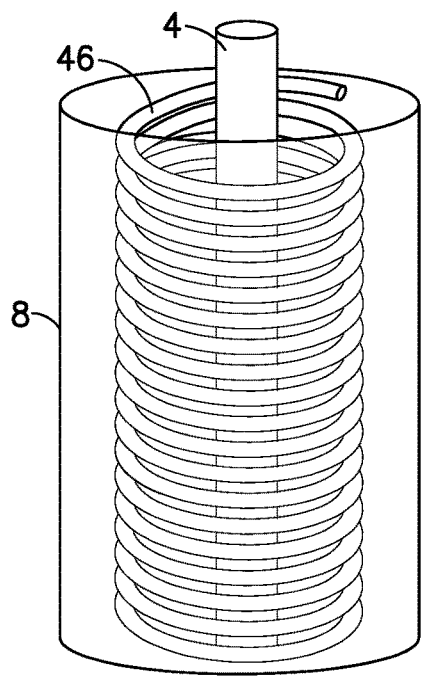
FIG. 9 is a diagram representing an isometric view of an optical impedance sensor having a spiral receiving optical fiber for use in a reservoir having a small depth, such as at a tip of a wing fuel tank.

In conjunction with the installation of a tall sensor in a fuel tank compartment near the root of the wing, a short sensor may be installed in a fuel tank compartment at the tip of the wing. Despite the short length of this sensor, the accuracy requirement is still 1%. FIG. 9 is a diagram representing an isometric view of an optical impedance sensor having a spiral receiving optical fiber 46 for use in a reservoir having a small depth, such as at a tip of a wing fuel tank. The spiral receiving optical fiber 46 is placed inside a meniscus tube 8, wrapped around a central transmitting optical fiber 4, to increase optical power pickup per unit sensor length.

To improve linearity of optical response due to different stratification layers of fuel (different fuel densities), variable pitch of a spiral receiving optical fiber or variable side leakage of a straight receiving optical fiber can be employed.

A wing fuel tank system that uses electrical sensors can be retrofitted by substituting the optical sensors disclosed herein. Double shielded electrical wiring for the electrical sensors can be replaced with light and flexible plastic optical fiber, eliminating weight from the wiring and supporting brackets, and eliminating electromagnetic effects from lightning, shorting, fraying of electrical wiring.

The passive optical sensors disclosed herein preferably use rugged plastic optical fiber. No shielding/bonding/grounding of signal wiring is required. There is no possibility of igniting fuel. As a result of using optical impedance sensors to measure fuel levels, the weight and cost of an airplane can be reduced.

While optical impedance sensors have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

In addition, the method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. An optical impedance sensor comprising:
a tube having an internal volume;
a first light guide comprising a first optical fiber and a first tube which encases said first optical fiber, wherein said first tube comprises a first jacket having a longitudinal slot and a first lens disposed in said longitudinal slot of said first jacket and optically coupled to said first optical fiber, and said first optical fiber comprises a cladding having a non-uniform surface in an area bounded by said longitudinal slot of said first jacket; and
a second light guide comprising a second optical fiber spaced apart from said first optical fiber, wherein said second optical fiber comprises a cladding having a non-uniform surface in an area confronting said longitudinal slot of said first jacket.

2. The optical impedance sensor as recited in claim 1, wherein said second light guide further comprises a second tube which encases said second optical fiber, said second tube comprising a second jacket having a longitudinal slot and a second lens disposed in said longitudinal slot of said second jacket and optically coupled to said second optical fiber, wherein said longitudinal slots of said first and second jackets are arranged in mutual opposition so that at least some light emitted from said longitudinal slot of said first jacket will directly enter said longitudinal slot of said second jacket.

3. The optical impedance sensor as recited in claim 1, further comprising a third light guide comprising a third optical fiber and a second tube which encases said third optical fiber, wherein said second tube comprises a second jacket having a longitudinal slot and a second lens disposed in said longitudinal slot of said second jacket and optically coupled to said third optical fiber, and said third optical fiber comprises a cladding having a non-uniform surface in an area bounded by said longitudinal slot of said second jacket.

4. The optical impedance sensor as recited in claim 1, further comprising a curved reflective surface disposed between said first optical fiber and said first jacket.

5. The optical impedance sensor as recited in claim 1, wherein said first jacket is made of a material which is not optically transparent or translucent.

6. A system for measuring a level of liquid in a reservoir, comprising:
a tube having an internal volume, said tube being disposed in the reservoir;
an optical source for outputting light;
an optical detector for converting impinging light into an electrical signal representing an optical power of the impinging light;
a first light guide comprising a first optical fiber and a first tube which encases said first optical fiber, wherein said first tube comprises a first jacket having a longitudinal slot and a first lens disposed in said longitudinal slot of said first jacket and optically coupled to said first optical fiber, and said first optical fiber comprises a cladding and a core inside said cladding, said cladding of said first optical fiber having a non-uniform surface in an area bounded by said longitudinal slot of said first jacket, and said core of said first optical fiber being optically coupled to receive light from said optical source; and
a second light guide comprising a second optical fiber spaced apart from said first optical fiber, wherein said second optical fiber comprises a cladding and a core inside said cladding, said cladding of said second optical fiber having a non-uniform surface which receives light emitted by said first optical fiber through said longitudinal slot of said first jacket, and said core of said second optical fiber being optically coupled to output light to said optical detector.

7. The system as recited in claim 6, further comprising a computer system programmed to compute a level of liquid in said reservoir based on optical power data received from said optical detector.

8. The system as recited in claim 6, wherein said optical source comprises a laser and said optical detector comprises a photodiode.

9. The system as recited in claim 6, wherein the reservoir is a fuel tank on an airplane.

10. The system as recited in claim 6, wherein said second light guide further comprises a second tube which encases said second optical fiber, said second tube comprising a second jacket having a longitudinal slot and a second lens disposed in said longitudinal slot of said second jacket and optically coupled to said second optical fiber, wherein said longitudinal slots of said first and second jackets are arranged in mutual opposition so that at least some light emitted from said longitudinal slot of said first jacket will directly enter said longitudinal slot of said second jacket.

11. The system as recited in claim 6, further comprising a third light guide comprising a third optical fiber and a second tube which encases said third optical fiber, wherein said second tube comprises a second jacket having a longitudinal slot and a second lens disposed in said longitudinal slot of said second jacket and optically coupled to said third optical fiber, and said third optical fiber comprises a cladding having a non-uniform surface in an area bounded by said longitudinal slot of said second jacket.

12. The system as recited in claim 11, wherein said first and second lenses are disposed at different elevations.

13. The system as recited in claim 6, further comprising a curved reflective surface disposed between said first optical fiber and said first jacket.

14. A light guide comprising:
an optical fiber having an axis and a circumferential surface;
a jacket having a longitudinal slot that extends parallel to said axis of said optical fiber, said jacket being in contact with said circumferential surface of said optical fiber except in an area of said longitudinal slot; and a lens disposed in said longitudinal slot of said jacket and interfaced with said circumferential surface of said optical fiber, wherein said optical fiber comprises a cladding having a non-uniform surface in an area bounded by said longitudinal slot of said jacket.

15. The light guide as recited in claim 14, further comprising a curved reflective surface disposed between said optical fiber and said jacket.

16. The light guide as recited in claim 14, wherein said jacket is made of a material which is not optically transparent or translucent.

17. A method for measuring a level of fuel in a fuel tank having multiple compartments, comprising:
placing a first tube in a first compartment;
placing a first light guide inside the first tube with an orientation that will be generally perpendicular to a surface of the fuel when the first compartment is at least partially filled with fuel, wherein the first light guide comprises a first optical fiber that is encased to prevent wetting of the first optical fiber when the first light guide is immersed in the fuel;
placing a second light guide inside the first tube spaced apart from and generally parallel with the first light guide, wherein the second light guide comprises a second optical fiber that is encased to prevent wetting of the second optical fiber when the second light guide is immersed in the fuel;
emitting light along a length of the first light guide toward a length of the second light guide;
detecting the optical power output from the second light guide; and
determining a level of the fuel in the first compartment based on the detected optical power output from the second light guide.

18. The method as recited in claim 17, wherein said step of determining the level of fuel comprises comparing the detected optical power with a database of calibrated fuel level versus optical power.

19. The method as recited in claim 17, further comprising:
placing a second tube in a second compartment having a height less than a height of the first compartment;
placing a third light guide inside the second tube with an orientation that will be generally perpendicular to a surface of the fuel when the second compartment is at least partially filled with fuel, wherein the third light guide comprises a third optical fiber that is encased to prevent wetting of the third optical fiber when the third light guide is immersed in the fuel;
placing a fourth light guide inside the second tube spaced apart from and surrounding the third light guide, wherein the fourth light guide has a spiral shape and comprises a fourth optical fiber that is encased to prevent wetting of the fourth optical fiber when the fourth light guide is immersed in the fuel;
emitting light along a length of the third light guide toward a length of the fourth light guide;
detecting the optical power output from the fourth light guide; and
determining a level of the fuel in the second compartment based on the detected optical power output from the fourth light guide.

20. The method as recited in claim 17, wherein the fuel tank is incorporated in a wing of an aircraft.

* * * * *